SELECTIVE NEGATIVE-FEEDBACK AMPLIFIER

Filed Oct. 8, 1958

INVENTOR.
ELMER W. SCHWITTEK
BY
ATTORNEY

United States Patent Office 2,988,705

Patented June 13, 1961

2,988,705

SELECTIVE NEGATIVE-FEEDBACK AMPLIFIER

Elmer W. Schwittek, Penfield, N.Y., assignor to General Dynamics Corporation, Rochester, N.Y., a corporation of Delaware Filed Oct. 8, 1958, Ser. No. 766,035
3 Claims. (Cl. 330—94)

This invention relates to amplifiers and is particularly directed to power amplifiers for working into a low impedance load and for producing a minimum of cross modulation.

Cathode followers are commonly employed to couple a high impedance signal source to a low impedance output or load circuit. It is generally known that when the impedance is high between the cathode terminal and reference ground, the cathode follower circuit wall withstand very high signal voltages between grid and ground without overloading and without distortion. This is attributable to the fact that there is nearly a 100% feedback. On the other hand, when the impedance from the cathode terminal to ground is relatively low, the cathode follower circuit will yield substantial quantities of power gain although at the expense of increased distortion and increased cross talk, or cross modulation.

The object of this invention is to provide an improved amplifier of the cathode follower type in which the cathode to ground impedance is selectively high for unwanted signal frequencies and selectively low for wanted frequencies.

The objects of this invention are attained by connecting a series resonant circuit between cathode and ground and coupling the output circuit to said series resonant circuit. The series circuit is made resonant to the desired frequency so that the cathode to ground impedance for that frequency is relatively low and the power gain of the amplifier is relatively high. The power gain for unwanted signals, however, is relatively low as desired.

Other objects and features of this invention will become apparent to those skilled in the art by referring to the embodiments of the invention described in the following specification and shown in the accompanying drawing in which.

Figure 1:
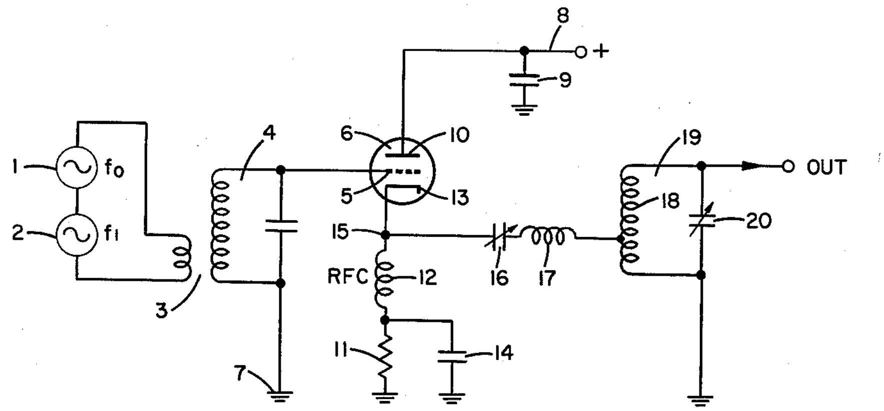
FIG. 1 is a circuit diagram of the preferred embodiment of the invention.

It is assumed that the signal $f_0$ is of radio or intermediate frequency and is mixed with undesired signal frequency $f_1$ and with noise voltages. The signal source 1 and 2 is coupled by the transformer 3 to the input of the amplifier of this invention. Preferably the amplifier input comprises a conventional tank circuit 4, connected between the grid 5 of electron discharge device 6 and reference ground 7. The direct current anode source 8 is by-passed to ground by condenser 9 and is directly connected to the anode 10 without a load impedance.

The cathode is provided with a direct current circuit to ground for establishing the quiescent grid-to-cathode bias. The particular biasing circuit shown includes the resistor 11. To exclude all signal current from the biasing circuit, the radio frequency choke coil 12 is connected between the resistor 11 and the cathode 13. Resistor 11 is by-passed by condenser 14.

The circuit thus far described provides a maximum high impedance between the cathode terminal 15 and ground for all frequencies, $f_0$ and $f_1$.

Figure 2:
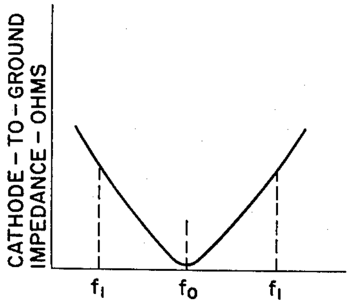
FIG. 2 shows a graph of the impedance of the cathode-to-ground circuit of the invention of FIG. 1.

According to an important and characteristic feature of this invention, the cathode terminal 15 is connected to ground, by-passing the choke 12, through a tunable series resonant circuit including tuning condenser 16 and inductance 17. By adjusting this circuit to resonate at the wanted frequency, $f_0$, the impedance for $f_0$ between cathode and ground is relatively quite low, and for non-resonant frequencies, $f_1$, the impedance is relatively high, as shown in FIG. 2. Accordingly the power gain for the amplifier is selectively high for the wanted frequency $f_0$. By employing low-loss low-resistant components for the tuning elements 16 and 17, the Q of the circuit can be made quite high and the rejection characteristics of the circuit improved.

Figure 3:
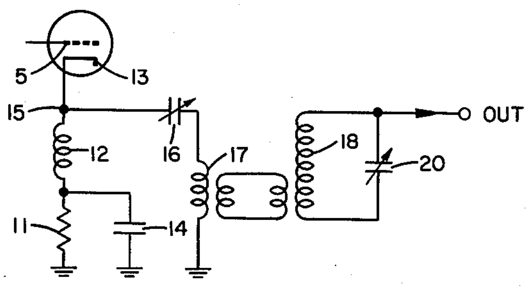
FIG. 3 shows an alternative load coupling circuit.

Power may be extracted from a series resonant circuit in several ways. It is preferred that one end of the series resonant circuit be tapped to an intermediate point on the inductance 18 of the output tank circuit 19. Condenser 20 tunes the tank circuit to the output frequency $f_0$. Although the inductance of winding 18 is between the tap and ground in the illustrated embodiment, this inductance can either be added to the inductance of coil 17 in computing the series resonance of the series output circuit 16 and 17, or the effects of this inductance can be eliminated by so selecting the position of the tap that the impedance to ground is essentially resistive. Alternatively, said tap could be connected directly to ground, and inductance 18 coupled inductively with coil 17, as shown in FIG. 3.

The cathode-to-ground impedance of the cathode follower of this invention is low for wanted signal frequencies and is high for unwanted signal or noise voltages. It can be seen that the circuit will provide selective negative feedback, the negative feedback being large for Off frequencies and relatively small for On frequency signals. This action prevents large Off frequency signals from causing tube overload and the resultant distortion, mixing, and cross talk. Many modifications may be made in the specific circuit details of the amplifier of this invention without departing from the scope of the invention as defined in the appended claims.

What is claimed is:

1. A cathode follower comprising a grid controlled electron discharge device, means for coupling a composite signal of wanted and unwanted frequencies between the grid and ground of said device, a radio frequency choke coil and a biasing resistor serially connected between said cathode and ground, a series resonant circuit including a series inductance coil and a tuning condenser connected in parallel with said choke coil and biasing resistor circuit, said series resonant circuit being tunable to the wanted frequency to provide low cathode-to-ground impedance and high power gain for said wanted signal, and means for coupling an output circuit to said series resonant circuit.

2. A cathode follower circuit comprising a grid controlled amplifier, an input signal circuit connected between the grid of said amplifier and ground, a biasing circuit including a resistor and a choke coil serially connected between said cathode and ground, an output tank circuit resonant to said wanted frequency, and effectively grounded at one end, a series resonant circuit coupled between the cathode of said amplifier and a tap at an intermediate point on the inductance of said tank circuit.

3. A cathode follower amplifier for signal frequencies having wanted and unwanted components, said amplifier comprising a grid-controlled electron discharge device, a direct current biasing circuit having a resistor of relatively low value connected between said cathode and ground to apply to said cathode a direct current bias, an input circuit connected between the grid of said device and said ground, a choke coil, said choke coil being connected in series with said resistor in the cathode-to-ground circuit, said coil having relatively high inductive impedance for all wanted and unwanted frequency components in said input circuit for degeneratively feeding back all said components to said input circuit for suppressing all said components, a series resonant circuit selectively tunable to wanted frequency components so that the reactive impedance across said series resonant circuit is substantially zero at said wanted frequency, said series-tuned circuit being connected between said cathode and ground for amplifying without degeneration said wanted frequencies, and a power output circuit coupled to said series resonant circuit.

References Cited in the file of this patent

UNITED STATES PATENTS

| | | |
|---|---|---|
| 1,799,093 | Farnham et al. | Mar. 31, 1931 |
| 2,250,598 | Neeteson | July 29, 1941 |
| 2,256,067 | Van Slooter | Sept. 16, 1941 |
| 2,293,262 | Koch | Aug. 18, 1942 |
| 2,794,909 | Berg | June 4, 1957 |
| 2,848,611 | Bousek | Aug. 19, 1958 |
| 2,868,898 | Phanos | Jan. 13, 1959 |